(12) United States Patent
Gopalakrishnan et al.

(10) Patent No.: US 10,391,746 B2
(45) Date of Patent: Aug. 27, 2019

(54) FLEXIBLE GLASS LAMINATE STRUCTURES FOR ARCHITECTURAL DESIGN AND OTHER APPLICATIONS

(71) Applicant: Corning Incorporated, Corning, NY (US)

(72) Inventors: Karthik Gopalakrishnan, Corning, NY (US); Michael William Price, Corning, NY (US); Robert Lee Smith, III, Painted Post, NY (US); Windsor Pipes Thomas, III, Painted Post, NY (US); James Ernest Webb, Corning, NY (US)

(73) Assignee: Corning Incorporated, Corning, NY (US)

( * ) Notice: Subject to any disclaimer, the term of this patent is extended or adjusted under 35 U.S.C. 154(b) by 12 days.

(21) Appl. No.: 15/316,579

(22) PCT Filed: Jun. 5, 2015

(86) PCT No.: PCT/US2015/034329
§ 371 (c)(1),
(2) Date: Dec. 6, 2016

(87) PCT Pub. No.: WO2015/188029
PCT Pub. Date: Dec. 10, 2015

(65) Prior Publication Data
US 2017/0190155 A1 Jul. 6, 2017

Related U.S. Application Data

(60) Provisional application No. 62/008,833, filed on Jun. 6, 2014.

(51) Int. Cl.
*B32B 7/12* (2006.01)
*B65H 18/28* (2006.01)
(Continued)

(52) U.S. Cl.
CPC .......... *B32B 17/10779* (2013.01); *B32B 7/12* (2013.01); *B32B 17/064* (2013.01);
(Continued)

(58) Field of Classification Search
CPC ........ B32B 17/10779; B32B 17/10807; B32B 7/12; B65H 18/28; B65H 2701/1724
(Continued)

(56) References Cited

U.S. PATENT DOCUMENTS 3,338,696 A 8/1967 Dockerty
3,574,030 A 4/1971 Callander et al.
(Continued)

FOREIGN PATENT DOCUMENTS

CN 201913952 U 8/2011
EP 1031409 1/2005
(Continued)

OTHER PUBLICATIONS

Notification of Transmittal of The International Search Report and Written Opinion of the International Searching Authority, or the Declaration, dated Jun. 5, 2015, pp. 1-13, International Application No: PCT/US2015/034329 European Patent Office, The Netherlands.
(Continued)

*Primary Examiner* — William K Cheung (57) ABSTRACT

A flexible glass laminate structure includes a flexible glass substrate having a thickness of no more than 0.3 mm. The flexible glass laminate structure includes a flexible glass layer including the flexible glass substrate. A property control layer is laminated to the flexible glass layer. A neutral axis of the flexible glass laminate is located outside the flexible glass layer when the flexible glass layer is in a compressive bend configuration.

20 Claims, 5 Drawing Sheets

(51) Int. Cl.
*D06N 7/00* (2006.01)
*B32B 17/10* (2006.01)
*B32B 17/06* (2006.01)

(52) U.S. Cl.
CPC ....... *B32B 17/10807* (2013.01); *B65H 18/28* (2013.01); *D06N 7/00* (2013.01); *B32B 2307/208* (2013.01); *B32B 2307/412* (2013.01); *B32B 2307/546* (2013.01); *B65H 2701/1724* (2013.01)

(58) Field of Classification Search
USPC ........................................................ 428/332
See application file for complete search history.

(56) References Cited

U.S. PATENT DOCUMENTS

| | | | |
|---|---|---|---|
| 3,682,609 | A | 8/1972 | Dockerty |
| 6,287,674 | B1 | 9/2001 | Verlinden et al. |
| 8,003,233 | B2 | 8/2011 | Thiel et al. |
| 8,497,006 | B2 | 7/2013 | Tomamoto et al. |
| 2009/0201443 | A1 | 8/2009 | Sasaki et al. |
| 2011/0081542 | A1 | 4/2011 | Georges |
| 2012/0034435 | A1 | 2/2012 | Borrelli |
| 2012/0094100 | A1 | 4/2012 | Takagi |
| 2013/0196163 | A1 | 8/2013 | Swanson |
| 2013/0306229 | A1 | 11/2013 | Yang et al. |
| 2014/0132132 | A1* | 5/2014 | Chowdhury .......... B32B 17/064 312/223.1 |
| 2014/0162036 | A1 | 6/2014 | Marcellus et al. |
| 2016/0009593 | A1 | 1/2016 | Brychell et al. |

FOREIGN PATENT DOCUMENTS

| | | |
|---|---|---|
| EP | 2698248 | 2/2014 |
| GB | 2074089 | 10/1981 |
| KR | 2006069788 A | 6/2006 |
| WO | 2009057460 | 5/2009 |
| WO | 2012166343 | 12/2012 |
| WO | 2013181484 A1 | 12/2013 |
| WO | 2013184904 A1 | 12/2013 |
| WO | 2014024931 | 2/2014 |
| WO | 2014032942 A1 | 3/2014 |
| WO | 2014035942 | 3/2014 |
| WO | 2014133925 | 9/2014 |
| WO | 2014166082 A1 | 10/2014 |

OTHER PUBLICATIONS

English Translation of CN201580042311.7 Office Action dated May 9, 2018; 12 Pages; Chinese Patent Office.

* cited by examiner

FLEXIBLE GLASS LAMINATE STRUCTURES FOR ARCHITECTURAL DESIGN AND OTHER APPLICATIONS

This application claims the benefit of priority under 35 U.S.C. § 371 of International Application No. PCT/US2015/034329 filed on Jun. 5, 2015, which claims the benefit of priority to U.S. Provisional Application No. 62/008,833 filed on Jun. 6, 2014, the content of each of which is incorporated herein by reference in its entirety.

TECHNICAL FIELD

The present invention relates to flexible glass laminate structures and, more particularly, to flexible glass laminate structures for architectural design and other applications.

BACKGROUND

Glass is frequently considered a good performing surface for architectural design media. Exemplary uses include wall decorations, windows, doors, etc. The aesthetic appeal of a glossy smooth surface, combined with the inherent durability of a glass surface with respect to scratches, chemical and heat resistance, and hermeticity, can provide a unique attribute set. However, the market share of glass as a medium for architectural design can be relatively low due to issues that have existed regarding conventional glass. Typical glass and glass-containing products for architecture are heavy and inflexible. What is needed are glass laminate structures that are suitable for use in architectural design that are readily handled (e.g., transported) and installed.

SUMMARY

The present concepts involve providing flexible glass laminate structures that maintain desired attributes of glass, such as a glossy smooth surface, durability with respect to scratches, chemical and heat resistance, and hermeticity that are suitable for use in architectural design and readily packaged, transported and installed. Applications include artistic custom signage, decorative architectural surfaces for use in lobbies and common areas, as well as, communication tools, e.g., a flexible wall-sized marker board that significantly reduces cost.

According to a first aspect, a flexible glass laminate structure comprising:
a flexible glass layer comprising a flexible glass substrate having a thickness of no more than 0.3 mm; and
a property control layer laminated to the flexible glass layer by an adhesive layer;
wherein the property control layer has an effective stiffness to unit area weight ratio of between about 0.03 $Nm^3/kg$ and about 0.4 $Nm^3/kg$;
wherein a neutral axis of the flexible glass laminate is located outside the flexible glass layer with the flexible glass layer in a compressive bend configuration.

According to a second aspect, there is provided the structure of aspect 1, wherein the flexible glass substrate has a glass edge strength of no less than about 100 MPa.

According to a third aspect, there is provided the structure of aspect 1 or aspect 2, wherein the property control layer comprises one or more stiffness control layers.

According to a fourth aspect, there is provided the structure of any one of aspects 1-3, wherein the property control layer comprises more than one stiffness control layer, at least one of the more than one stiffness control layers comprises a material having an effective stiffness to unit area weight ratio outside of a range between about 0.03 $Nm^3/kg$ and about 0.4 $Nm^3/kg$, and the property control layer comprises a material having an effective stiffness to unit area weight ratio within the range between about 0.03 $Nm^3/kg$ and about 0.4 $Nm^3/kg$.

According to a fifth aspect, there is provided the structure of any one of aspects 1-4, comprising a greater stiffness in a first direction than in a second direction different than the first direction.

According to a sixth aspect, there is provided the structure of any one of aspects 1-5, further comprising a film layer located at the adhesive layer, the film layer comprising a decorative pattern thereon that is visible through the flexible glass layer.

According to a seventh aspect, there is provided the structure of any one of aspects 1-5 further comprising a decorative pattern on a surface of the flexible glass substrate.

According to an eighth aspect, there is provided the structure of any one of aspects 1-7, wherein the property control layer comprises a polymer layer with a magnetized iron.

According to a ninth aspect, there is provided the structure of any one of aspects 1-8, wherein the neutral axis of the flexible glass laminate is located in the adhesive layer with the flexible glass laminate structure rolled to an inner diameter of at most about 30 inches.

According to a tenth aspect, a method of forming a flexible glass laminate structure, the method comprising:
laminating a flexible glass layer and a property control layer together using an adhesive layer, the flexible glass layer having a thickness of no more than 0.3 mm; and
locating a decorative pattern between the flexible glass layer and the property control layer such that the decorative pattern is visible through the flexible glass layer;
wherein a neutral axis of the flexible glass laminate structure is located outside the flexible glass layer with the flexible glass layer in a compressive bend configuration.

According to an eleventh aspect, there is provided the method of aspect 10, further comprising bending the flexible glass laminate structure such that the flexible glass layer faces a center of the bend with the neutral axis of the flexible glass laminate structure located outside the flexible glass substrate.

According to a twelfth aspect, there is provided the method of aspect 10 or aspect 11, wherein the neutral axis of the flexible glass laminate structure is located within the adhesive layer with the flexible glass laminate structure rolled to an inner diameter of at most about 30 inches.

According to a thirteenth aspect, there is provided the method of any one of aspects 10-12, comprising providing the property control layer with one or more stiffness control layers.

According to a fourteenth aspect, there is provided the method of any one of aspects 10-13, comprising providing the property control layer with more than one stiffness control layer, at least one of the more than one stiffness control layers comprising a material having an effective stiffness to unit area weight ratio outside of a range between about 0.03 $Nm^3/kg$ and about 0.4 $Nm^3/kg$, and the property control layer comprising a material having an effective stiffness to unit area weight ratio within the range between about 0.03 $Nm^3/kg$ and about 0.4 $Nm^3/kg$.

According to a fifteenth aspect, there is provided the method of any one of aspects 10-14, wherein the locating the decorative pattern comprises locating a film layer comprising the decorative pattern thereon at the adhesive layer, between the property control layer and the flexible glass layer.

According to a sixteenth aspect, there is provided the method of any one of aspects 10-14, wherein the locating the decorative pattern comprises providing the decorative pattern on a surface of the flexible glass substrate.

According to a seventeenth aspect, there is provided the method of any one of aspects 10-16, comprising providing the property control layer with a polymer layer comprising a magnetized iron.

According to an eighteenth aspect, a roll of a flexible glass laminate structure comprising a flexible glass layer having a thickness of no more than 0.3 mm and a property control layer laminated to the flexible glass layer by an adhesive layer;

the flexible glass laminate structure wound about a center of the roll to an inner diameter of at most about 30 inches;

the flexible glass layer located on an inner facing side of the flexible glass laminate structure such that a neutral axis of the flexible glass laminate structure is located outside the flexible glass layer.

According to a nineteenth aspect, there is provided the roll of aspect 18, wherein the property control layer comprises one or more stiffness control layers.

According to a twentieth aspect, there is provided the roll of aspect 18 or aspect 19, wherein the property control layer comprises more than one stiffness control layer, at least one of the more than one stiffness control layers comprises a material having an effective stiffness to unit area weight ratio outside of a range between about 0.03 $Nm^3/kg$ and about 0.4 $Nm^3/kg$, and the property control layer comprises a material having an effective stiffness to unit area weight ratio within the range between about 0.03 $Nm^3/kg$ and about 0.4 $Nm^3/kg$.

According to a twenty-first aspect, there is provided the roll of any one of aspects 18-20, further comprising a film layer located at the adhesive layer, wherein the film layer includes a decorative pattern thereon that is visible through the flexible glass layer.

According to a twenty-second aspect, there is provided the roll of any of aspects 18-20 further comprising a decorative pattern on a surface of the flexible glass substrate.

According to a twenty-third aspect, there is provided the roll of any one of apects 18-22, wherein the property control layer comprises a polymer layer with a magnetized iron.

According to a twenty-fourth aspect, there is provided the roll of any one of aspects 18-23, wherein the neutral axis of the flexible glass laminate structure is located in the adhesive layer.

According to a twenty-fifth aspect, there is provided the roll of any one of aspects 18-24, wherein the flexible glass layer has a glass edge strength of no less than about 100 MPa.

Additional features and advantages will be set forth in the detailed description which follows, and in part will be readily apparent to those skilled in the art from the description or recognized by practicing the invention as exemplified in the written description and the appended drawings and as defined in the appended claims. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features of the invention disclosed in this specification and in the drawings can be used in any and all combinations.

DETAILED DESCRIPTION

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Flexible glass substrates, when starting from an original, flat state can bend equally well along various different bend axes during uni-axial flexure (assuming the flexible glass substrate is an amorphous material and its properties are isotropic). Flexible glass substrates frequently experience higher stresses when bending along different axes simultaneously during bi-axial flexure. During impact, drop or handling events, unpredictable bi-axial flexure of the flexible glass substrates may occur, which can result in damage to the flexible glass substrates. For some applications, it can be beneficial if the flexible glass substrates can preferentially bend in a single, predictable uni-axial bend state, while maintaining flexibility for installation (e.g., around corners) and packaging (e.g., in a roll). A flexible glass laminate structure can be formed that allows uni-axial bending where the flexible glass layer is in a reasonable amount of compression, but limits uni-axial and bi-axial bending where the flexible glass layer experiences tension.

In addition, a low elastic modulus laminate structure can make it difficult to apply the flexible glass laminate structure to a variety of architectural structures, such as a wall or other vertically-oriented support surface. If the flexible glass laminate structure is too flexible, it will bend easily during the installation process and possibly break or otherwise damage the flexible glass layer. If the flexible glass laminate structure is too stiff, it can be difficult to roll the laminate and place it in a shipping container of reasonable size. High stiffness can also limit the curvature of the architectural surfaces to which the flexible glass laminate structure can be applied. To reduce the possibility of damage to the flexible glass laminate structure rolled onto a spool with the flexible glass layer on the inside surface (i.e., facing the center of the spool), the neutral axis can be located outside the flexible glass layer (e.g., in the adhesive layer). As used herein, the "neutral axis" is the axis in the cross section of the flexible glass laminate structure along which there are no changes in longitudinal stresses or strains upon bending. Doing so can reduce or eliminate tensile stresses being present in the flexible glass layer that may result in a glass fracture. To this end, the flexible glass laminate structures are located facing the center of the roll and may not be bent away from the glass side or in a roll with the glass on the outside, which can produce tensile stresses in the glass that are magnified due to the location of the neutral axis.

Embodiments described herein generally relate to flexible glass laminate structures that maintain desired attributes of glass, such as a glossy smooth surface, durability with respect to scratches, chemical and heat resistance, and hermeticity that are suitable for use in architectural design and readily packaged, transported and installed. The flexible glass laminate structures may be sufficiently flexible so the flexible glass laminate structures can be rolled onto a spool whose outer diameter is a predetermined size (e.g., between about 7 in and about 30 in) without the flexible glass layer of the flexible glass laminate structure fracturing, while also minimizing tensile stress in the flexible glass layer while rolled and being readily unrolled with reduced risk of fracture of the flexible glass layer.

The flexible glass laminate structures can have a stiffness-to-weight ratio which allows sufficient flexibility to roll the flexible glass laminate structure into a convenient size, but have sufficient stiffness to minimize fracture of the flexible glass layer and ease of handling. The flexible glass laminate structures may have greater stiffness in a direction parallel to an axis about which the laminate is rolled, a roll axis, compared to other directions and may have no tensile stress in the flexible glass layer when rolled to various diameters due to position of the flexible glass layer and composition of the flexible glass laminate structure to reduce the risk of glass fracture while rolled. Exemplary applications for the flexible glass laminate structures include artistic custom signage, decorative architectural surfaces for use in lobbies and common areas, as well as, communication tools, e.g. a flexible wall-sized marker board that significantly reduces cost.

Figure 1:
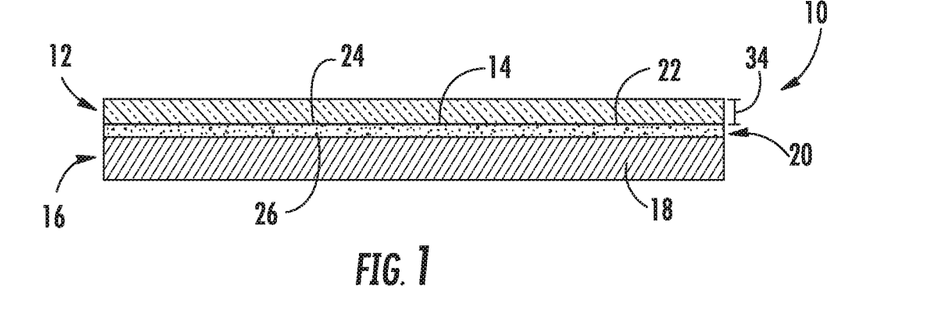
FIG. 1 is a side, section view of an embodiment of a flexible glass laminate structure.

Referring to FIG. 1, a side view of an exemplary flexible glass laminate structure 10 is illustrated. The flexible glass laminate structure 10 includes a flexible glass layer 12 that is formed of a flexible glass substrate 14 and a property control layer 16 that is laminated to the flexible glass layer 12. The property control layer 16 is formed of a material 18 different from the flexible glass layer 12, such as metals (e.g., aluminum, copper or stainless steel), plastics (e.g., vinyl), glasses (e.g., fiberglass), ceramics, composites (e.g., magnetized iron in a polymer matrix) or combinations of materials. In some embodiments, the property control layer 16 is a non-glass substrate layer. In various embodiments, the property control layer can comprise a substantially solid sheet (e.g., a foil or a film), a mesh (e.g., a woven or non-woven mesh), or another suitable structure.

The property control layer 16 may be formed using a polymer material, for example, any one or more of polyethylene teraphthalate (PET), polyethylene Naphthalate (PEN), ethylene tetrafluoroethylene (ETFE), or thermopolymer polyolefin (TPO™—polymer/filler blends of polyethylene, polypropylene, block copolymer polypropylene (BCPP), or rubber), polyesters, polycarbonate, polyvinylbuterate, polyvinyl chloride, polyethylene and substituted polyethylenes, polyhydroxybutyrates, polyhydroxyvinylbutyrates, polyetherimides, polyamides, polyethylenenaphalate, polyimides, polyethers, polysulphones, polyvinylacetylenes, transparent thermoplastics, transparent polybutadienes, polycyanoacrylates, cellulose-based polymers, polyacrylates and polymethacrylates, polyvinylalcohol, polysulphides, polyvinyl butyral, polymethyl methacrylate and polysiloxanes. It is also possible to use polymers which can be deposited/coated as pre-polymers or pre-compounds and then converted, such as epoxy-resins, polyurethanes, phenol-formaldehyde resins, and melamine-formaldehyde resins. The polymer layers may be transparent for some applications, but need not be for other applications. Selection of materials for various property control layer 16 will be described in greater detail below.

An adhesive layer 20 may be formed of an adhesive material 22 that may be used to laminate the flexible glass layer 12 to the property control layer 16 at the interfaces between their respective broad surfaces 24 and 26. The adhesive material 22 may be a non-adhesive interlayer, an adhesive, a sheet or film of adhesive, a liquid adhesive, a powder adhesive, a pressure sensitive adhesive, an ultraviolet-light curable adhesive, a thermally curable adhesive, or other similar adhesive or combination thereof. The adhesive material 22 may assist in attaching the flexible glass 14 to the property control layer 16 during lamination. Some examples of low temperature adhesive materials include Norland 68 cured by UV Flexcon V29TT, 3M OCA 8211, 8212, 8146, and 8172 (bonded by pressure at room temperature), 3M 4905, OptiClear® adhesive, silicones, acrylates, optically clear adhesives, encapsulant material, polyurethane, polyvinylbutyrates, ethylenevinylacetates, ionomers, and wood glues. Typical graphic adhesives such as Graphicmount and Facemount may also be used (as available from LexJet Corporation, located in Sarasota Fla., for example). Some examples of higher temperature adhesive materials include DuPont SentryGlas, DuPont PV 5411, Japan World Corporation material FAS and polyvinyl butyral resin. The adhesive layer 20 may be thin, having a thickness less than or equal to about 1000 μm, including less than or equal to about 500 μm, less than or equal to about 250 μm, less than or equal to about 50 μm, less than or equal to 40 μm, less than or equal to about 25 μm, or between about 0.1 mm and about 5 mm. The adhesives may also contain other functional components such as color, decoration, heat or UV resistance, AR filtration etc. The adhesive material 22 may be optically clear on cure, or may otherwise be opaque. In embodiments where the adhesive material 22 is a sheet or film of adhesive, the adhesive material 22 may have a decorative pattern or design visible through the thickness of the flexible glass, as shown in FIG. 2.

Figure 2:
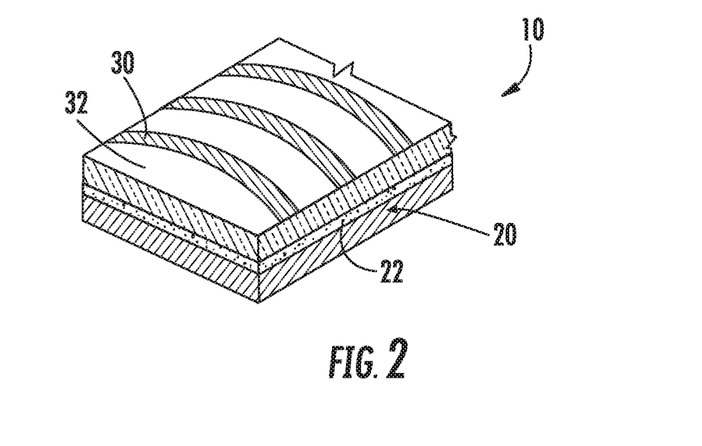
FIG. 2 perspective view of an embodiment of a flexible glass laminate structure having a decorative pattern.

In FIG. 2, the flexible glass laminate structure 10 includes an adhesive layer 20 formed of a sheet or film of adhesive material 22. In some embodiments, the adhesive material 22 has a pattern of stripes 30 that are visible from an outer surface 32 of the flexible glass layer 12. In some embodiments, the property control layer may provide a decorative pattern and/or the decorative pattern may be provided on either surface of the flexible glass substrate 14. In some embodiments, the decorative pattern may be provided on multiple layers 12, 16 and/or 20 or may be provided by a separate, non-adhesive layer, such as a film with decoration. Some air bubbles may become entrained in the flexible glass laminate structure during or after lamination, but air bubbles having a diameter of equal to or less than 100 μm may not affect the impact resistance of the laminated glass structure. Formation of air bubbles may be reduced by use of a vacuum lamination system or application of pressure to a surface of the structure during lamination. In other embodiments, the flexible glass layer 12 may be laminated without adhesive.

The flexible glass substrate 14 may have a thickness 34 of about 0.3 mm or less including but not limited to thicknesses of, for example, about 0.01-0.05 mm, about 0.05-0.1 mm, about 0.1-0.15 mm, about 0.15-0.3 mm, about 0.100 to about 0.200 mm, 0.3, 0.275, 0.25, 0.225, 0.2, 0.19, 0.18, 0.17, 0.16, 0.15, 0.14, 0.13, 0.12, 0.11, 0.10, 0.09, 0.08 0.07, 0.06, 0.05, 0.04, 0.03, 0.02, or 0.01 mm. The flexible glass substrate 14 may be formed of glass, a glass ceramic, a ceramic material or composites thereof. A fusion process (e.g., downdraw process) that forms high quality flexible glass substrates can be used in a variety of devices and one such application is flat panel displays. Glass substrates produced in a fusion process have surfaces with superior flatness and smoothness when compared to glass substrates produced by other methods. The fusion process is described in U.S. Pat. Nos. 3,338,696 and 3,682,609. Other suitable glass substrate forming methods include a float process, updraw process and slot draw methods. Additionally, the flexible glass substrate 14 may also contain anti-microbial properties by using a chemical composition for the glass including an Ag ion concentration on the surface in the range greater than 0 to 0.047 μg/cm$^2$, further described in U.S. Patent Application Publication No. 2012/0034435 A1. The flexible glass 14 may also be coated with a glaze composed of silver, or otherwise doped with silver ions, to gain the desired anti-microbial properties, as further described in U.S. Patent Application Publication No. 2011/0081542 A1. Additionally, the flexible glass 14 may have a molar composition of 50% $SiO_2$, 25% CaO, and 25% $Na_2O$ to achieve the desired anti-microbial effects.

Once the flexible glass substrate 14 is formed, it may be laminated to the property control layer 16 using a variety of apparatus and processes. Some examples include sheet-to-sheet lamination where pressure and/or heat are used to bond the flexible glass substrate 14 to the property control layer 16, for example, using the adhesive material 22. As another example, a roll-to-sheet or roll-to-roll lamination method may be used where; again, pressure is used to bond a continuous ribbon of flexible glass substrate 14 from a supply roll to a property control layer 16 either as a continuous substrate from a supply roll or a plurality of individual substrates. While it may be possible to form the flexible glass laminate structure to a final, desired dimension, it may be the case that some type of shaping (e.g., cutting) of the flexible glass laminate structure will be needed after the flexible glass laminate structure is formed. In these instances, the flexible glass laminate structure may be referred to as a preform flexible glass laminate structure in that the preform flexible glass laminate structure will undergo final processing in the field, for example, at an installation site to desired dimensions.

Figure 3:
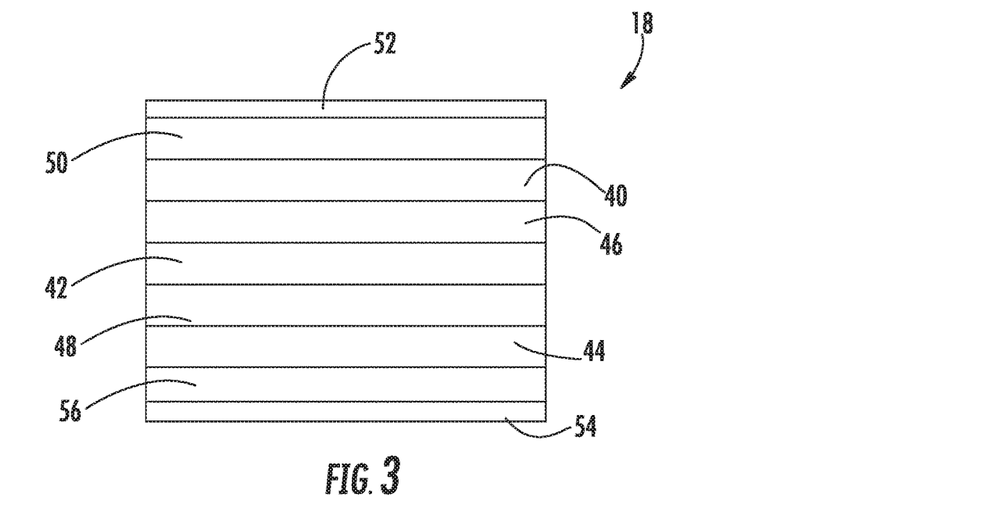
FIG. 3 is a schematic, side view of an embodiment of property control for use with the flexible glass laminate structure of FIG. 1.

Referring to FIG. 3, the property control layer 16 may include multiple stiffness control layers 40, 42 and 44. In the illustrated embodiment, three stiffness control layers 40, 42 and 44 are shown, however less than three stiffness control layers (e.g., 1 or 2) or more than three stiffness control layers (e.g., 4 or more, such as 5 or more, such as 10 or more) may be used. An adhesive layer 46 is located between the stiffness control layers 40 and 42 and an adhesive layer 48 is located between the stiffness control layers 42 and 44 to bind the stiffness control layers 40, 42 and 44 together in a stack. Another adhesive layer 50 may be used to bond a film layer 52 (e.g., a decorative film) to the stiffness control layer 40. Another film layer 54 may be bonded to the stiffness control layer 44 by adhesive layer 56. The multiple stiffness control layers can enable the property control layer to have a suitable effective stiffness to unit area weight ratio even if one or more individual stiffness control layers include materials with stiffness to unit area weight ratios outside of the desired range. The film layers 52 and 54 may be, for example, a plastic such as PET having a thickness of between about 6 μm and about 105 μm and an elastic modulus of between about 0.7 MPa and about 7 MPa. The film may be placed within the adhesive layers 50 and 56 to form a tape or a vinyl that can provide a white surface (e.g., for a dry erase surface) or a print decorated surface.

Figure 4:
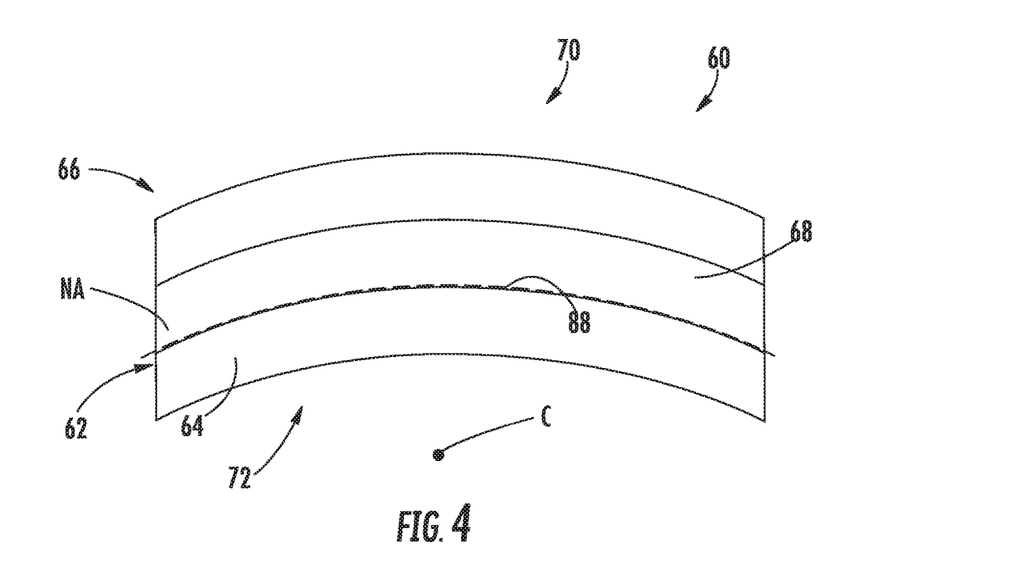
FIG. 4 is a schematic, side view of an embodiment of a flexible glass laminate structure in a compressive bend configuration.

Referring to FIG. 4, a schematic illustration of a portion of a rolled flexible glass laminate structure 60 includes a flexible glass layer 62 that is formed of a flexible glass substrate 64 and a property control layer 66 that is laminated to the flexible glass layer 62 by an adhesive layer 68, as described above. Point C represents the center axis of the roll 70, which contains multiple layers of the flexible glass laminate structure 60. As can be seen, the flexible glass laminate structure 60 bends around the point C, which introduces tensile and compressive stresses within the flexible glass laminate structure 60. The flexible glass substrate 64 is located at an inner side 72 of the flexible glass laminate structure 60, facing the point C. Bending the flexible glass laminate structure 60 in this fashion with the property control layer 66 bent around the outside of the flexible glass layer 62 is referred to herein as a "compressive bend configuration" for the flexible glass layer 62. As will be described in greater detail below, the materials, their associated elastic modulus and thicknesses can be selected to (i) provide a desired balance between stiffness and flexibility to facilitate handling and installation of the flexible glass laminate structure and (ii) reduce or eliminate tensile stress within the flexible glass layer 62 by locating the neutral axis NA of the flexible glass laminate structure 60 outside of the flexible glass layer 62, such as within the adhesive layer 68, when rolled. In other words, the neutral axis NA of the flexible glass laminate structure 60 can be located outside of the flexible glass layer 62 such that the flexible glass ribbon 64 is only in compression advantageously eliminating presence of tensile stress when rolled.

Figure 5:
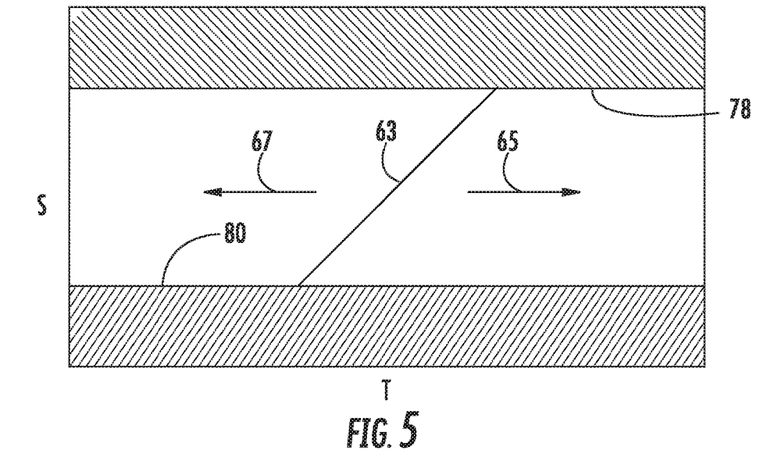
FIG. 5 represents an illustrative curve of laminate stiffness versus thickness of a flexible glass layer for a flexible glass laminate structure.

As can be appreciated, thickness of the flexible glass layer 62 can affect the flexibility of the flexible glass laminate structure 60. FIG. 5 represents an illustrative curve of laminate stiffness versus thickness of the flexible glass layer 62. The curve 63 represents a shifting neutral axis NA as the thickness T of the flexible glass layer 62 changes. As can be seen in this example, as thickness (T) of the flexible glass layer 62 increases (represented by arrow 65), the stiffness (S) of the flexible glass laminate structure 60 approaches an upper stiffness limit 78. If the flexible glass laminate structure 60 is too stiff, it can be difficult to roll the flexible glass laminate structure 60, for example, to place the flexible glass laminate structure 60 in a shipping container of reasonable size. High stiffness of the flexible glass laminate structure 60 can also limit conformity of the flexible glass laminate structure 60 to corners and bends of architectural structures. As thickness of the flexible glass layer 62 decreases (represented by arrow 67), the stiffness of the flexible glass laminate structure 60 approaches a lower stiffness limit 80. If the flexible glass laminate structure is too flexible, the flexible glass laminate structure 60 will bend easily during the installation process making the flexible glass laminate structure 60 difficult to handle, which can lead to damage to the flexible glass layer.

Figure 6:
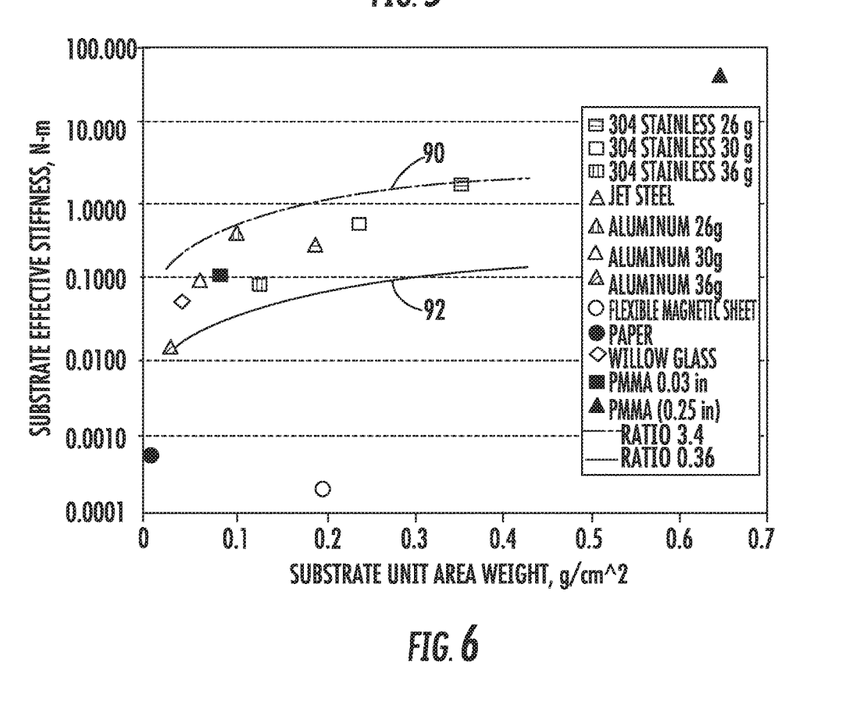
FIG. 6 is a plot of substrate effective stiffness versus substrate unit area weight for a number of materials.

Without wishing to be bound by theory, it is believed that the stiffness of the property control layer 66, and thus the overall flexible glass laminate structure 60 can be selected to control both the stiffness and flexibility of the flexible glass laminate structure 60 for optimizing handling and installation, while reducing or eliminating tensile stress within the flexible glass layer 62 when rolled by selecting a location of the neutral axis NA outside of the flexible glass layer 62. The effective stiffness (S') of various substrates can be calculated by $$\text{Stiffness}(k) = E \times I$$

where E is elastic modulus and I is moment of inertia of a cantilever beam and is given by $$I = \frac{(bh^3)}{12}$$

where b is the width of the beam and h is the height of the beam. Normalizing, $$S' = \frac{(Eh^3)}{12}$$

where S' is the effective stiffness. FIG. 6 illustrates effective stiffness values versus unit area weight for various substrate materials.

The flexible glass laminate structures can provide sufficient flexibility to allow rolling of the flexible glass laminate structures to predetermined diameter so that the roll can fit through a typical residential and/or commercial door, and yet be sufficiently stiff for installation and handling. For example, a suitable property control material effective stiffness/unit area weight ratio may be between about 0.03 $Nm^3/kg$ and about 0.4 $Nm^3/kg$. The flexible glass laminate structure can also lie flat onto a wall or rounded surface with no wrinkles. The stiffness of the flexible glass laminate structure is governed primarily by the elastic modulus and thickness of each layer forming the flexible glass laminate structure. In this regard, acceptable materials, layer thicknesses, elastic moduli, glass edge strengths and adhesive attributes can be selected. For the flexible glass layer, thicknesses of no more than about 250 μm, such as between about 50 μm and 250 μm may be used with an elastic modulus of between about 50 GPa and about 100 GPa. In some embodiments, it may be desirable to maintain a glass edge strength of at least about 100 MPa, such as at least about 200 MPa for reliable handling and installation without damage to the flexible glass layer. For the adhesive layer, thickness can depend, at least in part, on the materials and elastic modulus being used in the various layers. Adhesive layer thicknesses of between about 10 μm and about 500 μm may be used with an elastic modulus of about 7 kPa and about 2760 kPa. Suitable adhesive materials include acrylics and silicones and may be pressure sensitive adhesives and liquid adhesives. Adhesive transfer tapes may also be used having, for example, between about 0.5 and about 1 mil thick plastic film with about 12 μm and about 38 μm of adhesive on each side of the plastic film (e.g., PET). For any film layers, film thicknesses of between about 6 μm and about 102 μm may be used with an elastic modulus of between about 0.7 MPa and about 7 MPa. As an example, PET films placed within the adhesive layer can provide a white surface or decorated surface that can be seen through the flexible glass layer.

As indicated above, the flexible glass layer may be ultra-thin and may have thicknesses of no more than about 300 μm, such as about 250 μm or less, such as about 100 μm or less such as 50 μm or less in order to provide sufficient flexibility for the flexible glass laminate structure 60. In instances where the flexible glass laminate structure 60 is rolled as shown by FIG. 4, selection of the property control layer 66 including the stiffness control layer based at least in part on its inherent flexibility or elastic modulus value can be used to minimize or even eliminate tensile stress in the flexible glass layer 62 due to bending in the roll.

Stiffness control layers in the property control layer can be used to locate the neutral axis NA at or near the interface between the flexible glass layer and adhesive layer (see interface 88 of FIG. 4). Locating the neutral axis NA at or near the interface between the flexible glass layer and the adhesive layer can increase the flexibility of the flexible glass laminate structure (compared to locating the neutral axis NA in the property control layer) while avoiding tensile stress in the flexible glass layer. Thus, in some embodiments, the neutral axis NA is located within the adhesive layer. The area between upper and lower limits 90 and 92 of FIG. 6 shows exemplary stiffness and weight per unit area that can be used to locate the neutral axis NA outside of the flexible glass layer, which can allow the flexible glass laminate structure to be rolled, while eliminating tensile stress within the flexible glass layer. Referring to the Table below, for example, PolyMag® (600 µm thickness) would need an elastic modulus on the order of about 16 GPa to locate the neutral axis NA at the interface between the adhesive layer and the flexible glass layer, rather than the approximate 0.01 GPa elastic modulus value shown in the Table. Accordingly, one or more additional stiffness control layers may be used.

For a tri-layer laminate composed of (i) a flexible glass layer, (ii) a stiffening control layer and (iii) an adhesive layer, the elastic modulus of the stiffening control layer ($E_P$) can be determined to minimize the tensile stress in the flexible glass layer when rolled based on the following equation:

$$E_P = \frac{1 - F - F\delta\alpha - \delta\alpha^2}{\beta(F + 2\alpha + 1)} E_G$$

where the laminate stress factor (F) is defined as:

$$F = \frac{1 - \delta\alpha^2 - 2\gamma\beta\alpha - \gamma\beta^2}{1 + \delta\alpha + \gamma\beta}$$

where,
 $\delta = E_A/E_G$
 $\alpha = t_A/t_G$
 $\beta = t_P/t_G$
 $\gamma = E_P/E_G$
 $E_A$=elastic modulus of the adhesive layer
 $E_G$=elastic modulus of the glass layer
 $t_A$=thickness of adhesive
 $t_P$=thickness of the stiffening layer
 $t_G$=thickness of the glass layer.

Based on the equation, F would need to be equal to zero in order to position the neutral axis NA of the laminate such that the stress ($\sigma_{max}$) applied to the glass is zero at the glass/adhesive interface based on the equation:

$$\sigma_{max} = \frac{E_G}{R}(y - y_0) = \frac{E_G t_G}{2R} F = 0$$

where R is the radius of curvature for the laminate. Based on F equal to zero, only a compressive stress is applied to the glass when the laminate is curved in a concave shape (FIG. 4), with the maximum compressive stress applied at surface 88 based on the equation:

$$\sigma_{max} = \frac{E_G}{R}(y - y_0) = \frac{E_G t_G}{2R}\left(-\frac{1 + 2\delta\alpha + \delta\alpha^2 + 2\gamma\beta + 2\gamma\beta\alpha + \gamma\beta^2}{1 + \delta\alpha + \gamma\beta}\right)$$

Altering the value of F to a value between zero and −1 will result in increasing the applied compressive stress at surface 94 (FIG. 4). At an F equal to −1, the compressive stress at surface 94 is equal to that exerted on bare glass under a concave shape, i.e.:

$$\sigma_{max} = -\frac{E_G t_G}{2R} \sigma_{max} = \frac{E_G t_G}{2R}.$$

Figure 7:
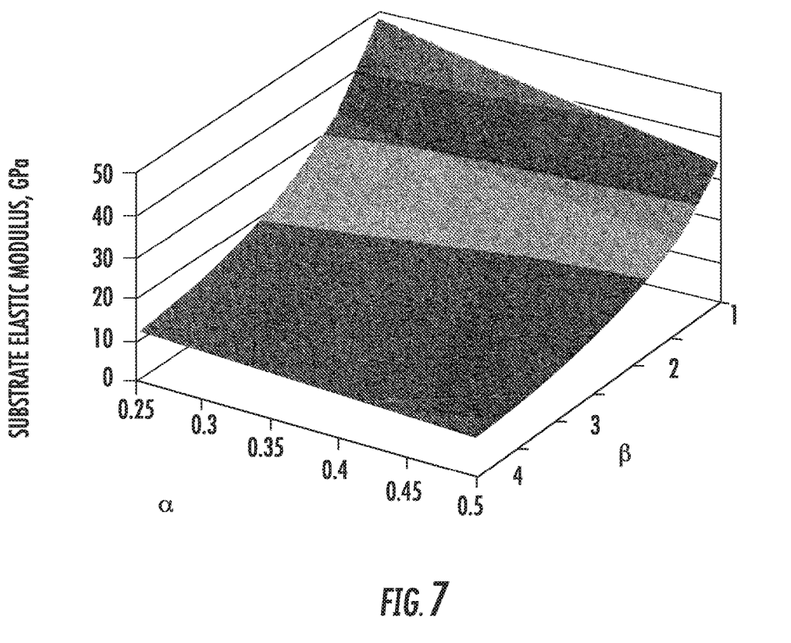
FIG. 7 represents an illustrated graph of elastic modulus values of a property control needed to minimize or eliminate tensile stress in a flexible glass layer of a rolled flexible glass laminate structure.

FIG. 7 represents an illustrative graph of elastic modulus values of a property control (or stiffness control) layer needed to minimize or eliminate tensile stress in the flexible glass layer of a rolled flexible glass laminate structure as shown by FIG. 4, where α is the adhesive/glass thickness ratio and β is the property control/glass thickness ratio. As can be seen, as the adhesive/glass thickness ratio increases, the elastic modulus values needed for the property control to minimize tensile stress in the flexible glass layer decreases. Conversely, as the adhesive/glass thickness ratio decreases, the elastic modulus values of the property control needed to minimize tensile stress in the flexible glass layer increases. Likewise, as the property control/glass thickness ratio increases, the elastic modulus values of the property control needed to minimize tensile stress in the flexible glass layer decreases. As the property control/glass thickness ratio decreases, the elastic modulus values of the property control needed to minimize tensile stress in the flexible glass layer increases. For this illustrated example, the elastic modulus of the flexible glass layer may be about 73.6 GPa and the elastic modulus for the adhesive layer may be about 20 MPa.

The property control or stiffness control layer may be selected to not only provide the desired balance between flexibility and stiffness, but also other characteristics, such as the ability to adhere magnets to the flexible glass laminate structure. The selection of materials for the stiffness control layers can provide the final thickness and weight for the overall flexible glass laminate structure and can also address aesthetic and other attributes. As one example, a thin carbon steel sheet (e.g., about 760 µm thick) can provide a relatively lightweight substrate to which magnets can be attached. As another example, a rubber sheet with magnetized iron particles can provide a relatively heavy substrate with high flexibility and the ability to attach magnets or other materials to the flexible glass laminate structure or to attach the flexible glass laminate structure to another structure (e.g., a magnetic wall or board). As yet another example, a carbon fiber layer can impart greater stiffness in preferred directions, while being thin. In some examples, greater stiffness in preferred directions can be achieved using a property control layer including a fiber composite layer (e.g., including fiberglass embedded in a polymer) with oriented fibers (e.g., arranged substantially parallel to one another) or a grooved or channeled layer (e.g., including one or more bendable substrate commercially available from Kerfkore Company, Brunswick, Ga. under the trade names Kerfkore, Timberflex, Flexboard, FlexGreen, econoKORE, or Foamkore). In doing so, the flexible glass laminate structure can be more flexible in one direction and allow rolling to a small radius compared to rolling in the other direction. Greater stiffness in one direction over the other direction can aid in handling and installation of the flexible glass laminate structure.

As an example of a property control layer used for a particular result other than stiffness control, PolyMag®, commercially available from Eriez Magnetics, Erie Pa., embeds magnetic particles in a flexible, plastic resin or rubber material that can be used as a property control. The PolyMag® material tends to be heavy and flexible and additional stiffness control layers may be used. The stiffness control layers may be sufficiently flexible to roll the flexible glass laminate structure to an inner diameter of at most about 30 inches or less, such as between about 7 inches and 30 inches. Various property control materials, which may be suitable as one or more stiffness control layers or for use as a decoration or other properties are illustrated in the table below for a flexible glass thickness of 200 µm, glass elastic modulus of 73.6 GPa, adhesive thickness of 50 μm and adhesive elastic modulus of 20 MPa.

TABLE

Exemplary Property controls
(F = laminate stress factor; $t_G$ = glass thickness)

| Attribute | PolyMag ® | Jet Steel | 30 gauge Stainless Steel |
|---|---|---|---|
| Substrate Elastic Modulus, GPa | 0.01 | 200 | 200 |
| Substrate Thickness, μm | 600 | 250 | 310 |
| Effective Stiffness (S'), N-m | 0.00018 | 0.26 | 0.5 |
| F | 1 | −1.12 | −0.64 |
| Neutral Axis (NA) position | $t_G/2$ | $1.56 \times t_G$ | $1.73 \times t_G$ |

Figure 8:
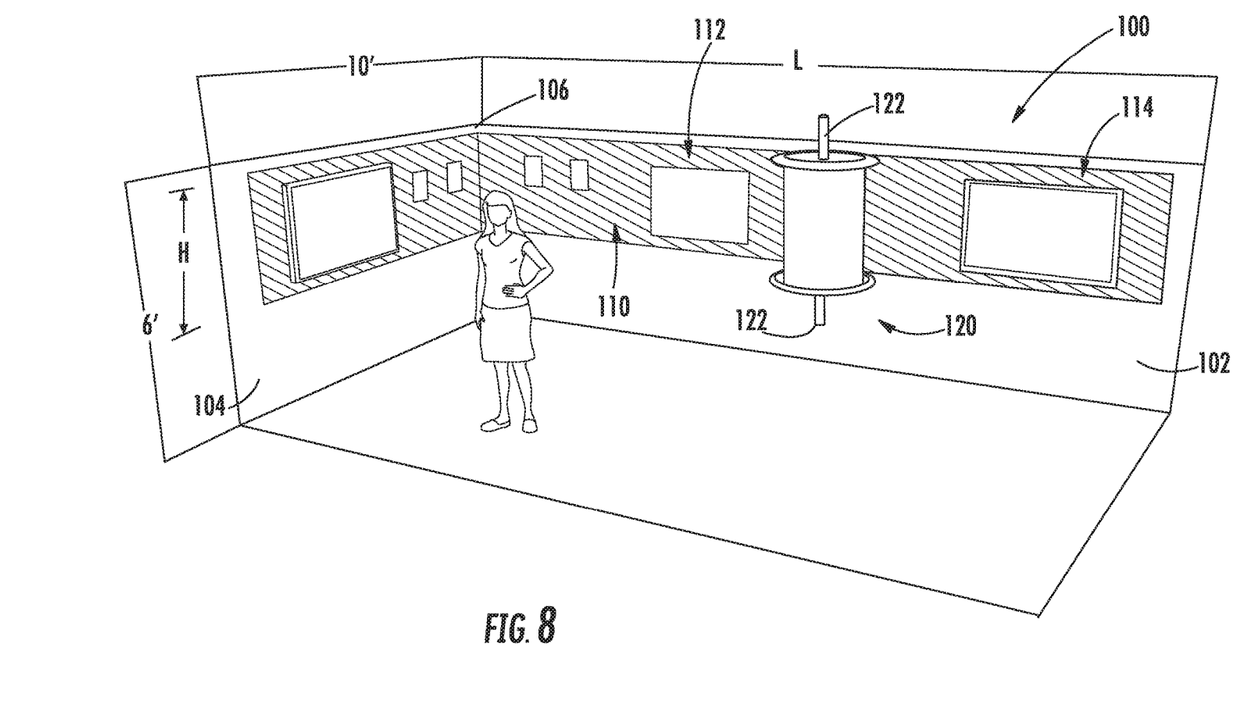
FIG. 8 illustrates an embodiment of a flexible glass laminate structure used in architectural design.

Referring to FIG. 8, an exemplary flexible glass laminate structure 100 is illustrated for use in architectural design. In this embodiment, the flexible glass laminate structure 100 may be formed as a continuous ribbon having a length (e.g., about 10 feet or more, such as about 20 feet or more, such as about 25 feet or more) that is greater than its height (e.g., between about 1 and about 5 feet, such as about 3 feet). As can be seen, the flexible glass laminate structure 100 can be applied along walls 102 and 104 that are arranged perpendicular to one another at a corner 106. The flexible glass laminate structure 100 may continuously round the corner 106, for example, at a bend radius of about 12 inches.

The flexible glass laminate structure 100 may include a variety of regions 110, 112 and 114, each region serving one or more different purposes. For example, region 110 may serve an aesthetic purpose having a decorative pattern (e.g., formed using a decorative film) that is viewable through the flexible glass layer. Region 112 may provide a writing area where a dry erase marker or other suitable writing device may be used to removably write on the flexible glass surface. Region 114 may be transparent to allow viewing of a television or other device. In some embodiments, openings may be formed through the flexible glass laminate structure to accommodate electronic devices such as appliances, televisions, computer screens, etc.

The flexible glass laminate structure 100 may be reliably mounted to the walls 102 and 104, for example, using a spool assembly 120. The flexibility and stress management arrangement of the flexible glass laminate structure 100 allows the flexible glass laminate structure 100 to be wound around the spool assembly 120 (e.g., at a minimum 14 in radius and a maximum 24 in radius) and to be unwound for its application to an architectural surface. The relatively light weight of the laminate structure 100 allows for handling and installation of the flexible glass laminate structure 100 without any need for lift-assist devices. Handles 122 (e.g., collapsible handles) may be provided to aid in installation. Guide rails may positioned along the walls to help guide the spool assembly 120 during installation of the flexible glass laminate structure 100.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the following claims.

The invention claimed is:

1. A flexible glass laminate structure comprising:
   a flexible glass layer comprising a flexible glass substrate having a thickness of no more than 0.3 mm; and
   a property control layer laminated to the flexible glass layer;
   wherein the property control layer has an effective stiffness to unit area weight ratio of between about 0.03 $Nm^3/kg$ and about 0.4 $Nm^3/kg$; and
   wherein a neutral axis of the flexible glass laminate structure is located outside the flexible glass layer when the flexible glass layer is in a compressive bend configuration.

2. The flexible glass laminate structure of claim 1, wherein the flexible glass substrate has a glass edge strength of no less than about 100 MPa.

3. The flexible glass laminate structure of claim 1, wherein the property control layer comprises more than one stiffness control layer, and at least one of the more than one stiffness control layers comprises a material having an effective stiffness to unit area weight ratio outside of a range between about 0.03 $Nm^3/kg$ and about 0.4 $Nm^3/kg$.

4. The flexible glass laminate structure of claim 1 comprising a greater stiffness in a first direction than in a second direction different than the first direction.

5. The flexible glass laminate structure of claim 1 further comprising a film layer located between the flexible glass layer and the property control layer, the film layer comprising a decorative pattern thereon that is visible through the flexible glass layer.

6. The flexible glass laminate structure of claim 1 further comprising a decorative pattern on a surface of the flexible glass substrate.

7. The flexible glass laminate structure of any of claim 1, wherein the property control layer comprises a polymer layer with a magnetized iron.

8. The flexible glass laminate structure of claim 1, wherein the property control layer is laminated to the flexible glass layer by an adhesive layer, and the neutral axis of the flexible glass laminate is located in the adhesive layer when the flexible glass laminate structure is rolled to an inner diameter of at most about 30 inches.

9. A method of forming a flexible glass laminate structure, the method comprising:
   laminating a flexible glass layer and a property control layer together, the flexible glass layer having a thickness of no more than 0.3 mm; and
   locating a decorative pattern between the flexible glass layer and the property control layer such that the decorative pattern is visible through the flexible glass layer;
   wherein a neutral axis of the flexible glass laminate structure is located outside the flexible glass layer eliminating tensile stress in the flexible glass layer when the flexible glass layer is in a compressive bend configuration.

10. The method of claim 9, wherein the flexible glass layer and the property control layer are laminated together using an adhesive layer, and the neutral axis of the flexible glass laminate structure is located within the adhesive layer when the flexible glass laminate structure is rolled to an inner diameter of at most about 30 inches.

11. The method of any of claim 9 comprising providing the property control layer with more than one stiffness control layer, and at least one of the more than one stiffness control layers comprising a material having an effective stiffness to unit area weight ratio outside of a range between about 0.03 Nm$^3$/kg and about 0.4 Nm$^3$/kg.

12. The method of any of claim 9 wherein the locating the decorative pattern comprises at least one of:
   locating a film layer comprising the decorative pattern thereon between the property control layer and the flexible glass layer; or
   providing the decorative pattern on a surface of the flexible glass substrate.

13. The method of claim 9 comprising providing the property control layer with a polymer layer comprising a magnetized iron.

14. A roll of a flexible glass laminate structure comprising:
   a flexible glass layer having a thickness of no more than 0.3 mm and a property control layer laminated to the flexible glass layer;
   the flexible glass laminate structure wound about a center of the roll to an inner diameter of at most about 30 inches;
   the flexible glass layer located on an inner facing side of the flexible glass laminate structure such that a neutral axis of the flexible glass laminate structure is located outside the flexible glass layer eliminating tensile stress in the flexible glass layer.

15. The roll of claim 14, wherein the property control layer comprises more than one stiffness control layer, and at least one of the more than one stiffness control layers comprises a material having an effective stiffness to unit area weight ratio outside of a range between about 0.03 Nm$^3$/kg and about 0.4 Nm$^3$/kg.

16. The roll of any of claim 14 further comprising a film layer located between the flexible glass layer and the property control layer, wherein the film layer includes a decorative pattern thereon that is visible through the flexible glass layer.

17. The roll of claim 14 further comprising a decorative pattern on a surface of the flexible glass substrate.

18. The roll of claim 14, wherein the property control layer comprises a polymer layer with a magnetized iron.

19. The roll of claim 14, wherein the property control layer is laminated to the flexible glass layer with an adhesive layer, and the neutral axis of the flexible glass laminate is located in the adhesive layer.

20. The roll of claim 14, wherein the flexible glass layer has an edge strength of no less than about 100 MPa.

* * * * *

UNITED STATES PATENT AND TRADEMARK OFFICE
CERTIFICATE OF CORRECTION

PATENT NO. : 10,391,746 B2  
APPLICATION NO. : 15/316579  
DATED : August 27, 2019  
INVENTOR(S) : Karthik Gopalakrishnan et al.

Page 1 of 1

It is certified that error appears in the above-identified patent and that said Letters Patent is hereby corrected as shown below:

In the Claims

In Column 14, Line 36, Claim 7, delete "any of claim" and insert -- claim --, therefor.

In Column 14, Line 65, Claim 11, delete "any of claim" and insert -- claim --, therefor.

In Column 15, Line 4, Claim 12, delete "any of claim" and insert -- claim --, therefor.

In Column 16, Line 10, Claim 16, delete "any of claim" and insert -- claim --, therefor.

Signed and Sealed this  
Thirty-first Day of December, 2019

Andrei Iancu  
*Director of the United States Patent and Trademark Office*